UNITED STATES PATENT OFFICE.

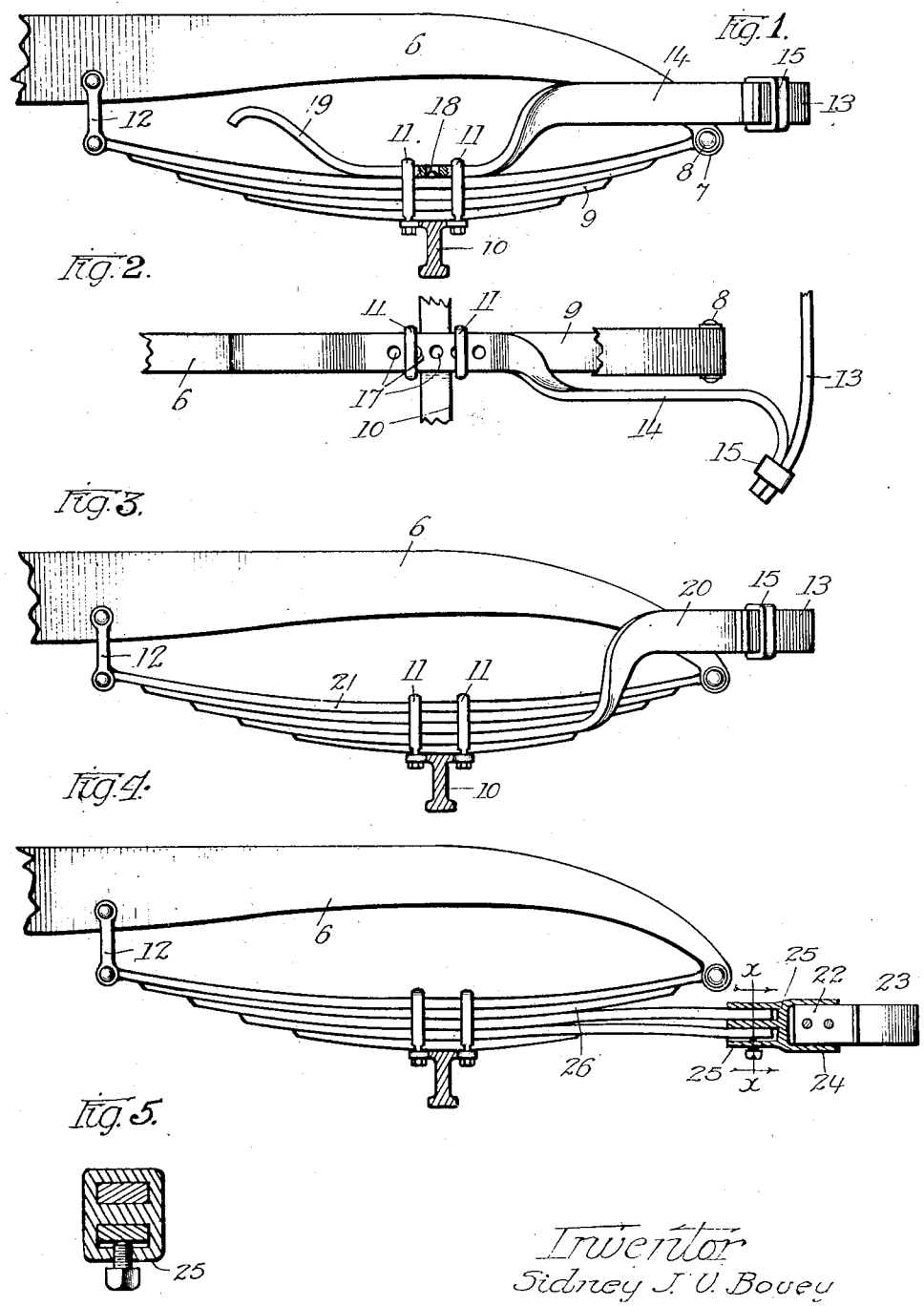

SIDNEY J. V. BOVEY, OF CHICAGO, ILLINOIS.

BUMPER FOR VEHICLES.

1,373,163.  Specification of Letters Patent.  Patented Mar. 29, 1921.

Application filed October 4, 1919. Serial No. 328,524.

*To all whom it may concern:*

Be it known that I, SIDNEY J. V. BOVEY, a citizen of the United States, residing at Chicago, in the county of Cook and State of Illinois, have invented new and useful Improvements in Bumpers for Vehicles, of which the following is a full, clear, and exact description.

My invention relates to bumpers for vehicles and particularly the type known as automobile bumpers.

The objects of my invention are to provide a simply constructed neat looking bumper possessing great resiliency while at the same being strong and durable, and capable of being easily and quickly installed by fixtures used in connection with the springs. This I accomplish by the means hereinafter described and as particularly pointed out in the claims.

In the drawings:

Figure 1 is a side view of the forward part of one side of the chassis of an automobile showing my improved bumper attached to the forward springs.

Fig. 2 is a plan view of the same.

Fig. 3 is a side view of another modified construction of the same.

Fig. 4 is a side view of yet another modification.

Fig. 5 is a cross section taken on dotted line x, x, Fig. 4.

Having reference to Figs. 1 and 2 of the drawings 6 represents one of the side members or reaches of the chassis, the forward ends of which are curved downward and provided with bifurcations or lugs 7, and are connected by a transverse bolt 8 to which the forward end of the longest and master leaf of the semi-elliptical spring 9 is secured. This spring is securely clamped about midway its length to the forward axle 10 by means of clips 11, and the rear end of the said master leaf is secured to the reach by means of short links 12.

The foregoing construction of the chassis is not new and is described simply to elucidate the construction and application of my improved bumper, which consists of a transverse bumper bar 13 and its supporting arms 14, and is, preferably, made of a flat bar of metal disposed so that its broadest sides are vertical and it is usually curved and of such length that its ends are in front of the wheels of the automobile when properly installed in place.

The arms 14, are preferably made of flat bars of metal of the same dimensions in cross section as said bar, and the front ends of these arms are bent laterally and secured flatwise to the end portions of the bumper by means of metal bands 15, or other suitable means. From said bar arms 14 extend rearwardly, and, at a point between the same, they are twisted so as to bring their broad flat sides in a horizontal plane and slightly curved to a position over the springs 9 and downward to enable them to come in contact with and rest upon the spring as they extend rearwardly until they have passed on the axle 10. The portions of these arms extending over the axle are provided with a longitudinal series of holes 17, that are, preferably, equidistant apart, and said arms are adjusted longitudinally by moving them lengthwise until the teat 18, projecting upward from the center of length of the uppermost leaf of the spring, engages and enters the desired hole, whereupon the arms are clamped to the springs by the same clips 11, that clamp the springs of the axle.

Said arms extend rearwardly past clips 11, a suitable distance and then are bent upward and rearward like a swan's neck to serve as a shock absorbing member 19, which will be engaged by the underside of the upperposed reach when the load or resiliency depresses the springs sufficiently. This shock absorbing member may be dispensed with, but I prefer its use, and its shape may be varied from that shown without departing from the spirit of my invention. In Fig. 3 of the drawings, I show a slightly modified construction of the rear portion of arms 20 (corresponding in most respects to arms 14) in which said arms after being twisted are curved downward to a greater extent than arms 14, have the remainder of their lengths interposed between the lower leaves of the spring 21 and constitute one of the members thereof.

Figs. 4 and 5 of the drawings illustrate yet another modification. In this modification the arms 22 are cut off and terminate a short distance back of the bumper bar 23, and are secured in the socket in the forward end of a cast metal coupling 24. The rear part of this coupling has two seats or sockets 25, 25 therein that correspond in cross section to that of the leaves of the spring 26; two of which leaves are extended horizontally forward from the axle beyond the forward end of the master leaf and enter and are suitably secured in said sockets 25.

The principal feature of my invention is the securing of the arms of the bumper to or in the leaves of the spring, and I desire to be understood as claiming as my invention all modifications or changes in construction in the supporting arms of the bumper bar that accomplish this result.

What I claim as new is:

1. The combination with the forward side-springs of a vehicle, and axle supporting the same, of a transverse bumper and resilient arms the adjacent ends of which are directly secured to said bumper and are provided with portions that have broad flat horizontal surfaces that are secured directly to said springs.

2. The combination with the forward springs of a vehicle, and axle supporting the same, of a transverse bumper, and resilient arms made of flat bar metal secured to said bumper and extending rearwardly therefrom, which, at a given point, are twisted and bent to provide a portion having broad surfaces substantially at right angles to the broad surfaces of the remainder of their lengths, and means for securing said portions to said springs.

3. The combination with the forward springs of a vehicle, a bolster supported thereby, and an axle supporting said springs, of a transverse bumper, and resilient arms made of flat bar metal secured thereto and extending rearwardly therefrom, which, at a given point, are twisted and bent to provide a portion having broad surfaces that are substantially at right angles to the broad surfaces of the remainder of their lengths, and means securing said bolster and arms to said springs.

4. The combination with the forward springs of a vehicle, a transverse bolster supported thereby, an axle supporting said springs, and means securing the springs to the axle, of a transverse bumper, and resilient arms made of one continuous piece of flat bar metal to the forward ends of which said bumper is secured and which extend rearwardly therefrom and, at a given point, are twisted and bent to provide a portion whose broad surfaces are substantially at right angles to the broad surfaces of the remainder of its length, and means securing said arms and bolster to said springs.

5. The combination with the forward springs of a vehicle, a superposed transverse bolster mounted thereon, and an axle supporting said springs, of a transverse bumper-bar, and resilient arms made of a continuous piece of flat bar metal secured to said springs, and means securing said spring arms and bolster together.

6. The combination with the forward springs of a vehicle, a transverse bolster mounted upon and secured to said springs, an axle upon which said springs are mounted, and clips securing said bolster and springs together, of a transverse bumper, and resilient arms made of one continuous strip of flat bar metal which at their centers of length are twisted and bent to provide central portions whose broad surfaces will be substantially horizontal which are secured to said springs by said clips.

7. The combination with the forward springs of a vehicle, an axle to which the same is secured, and a transverse bolster supported upon the centers of length of said springs, of a transverse bumper made of flat bar metal, supporting-frames therefor consisting of a continuous strip of flat bar metal, which, at their centers of length, are secured to said springs, and clips for uniting the central portions of said bolster said springs and said supporting-frame together.

8. The combination with the forward springs of a vehicle, an axle to which the same is secured, and a transverse bolster supported upon the center of length of said spring, of a transverse bumper made of flat bar metal, supporting-frames therefor consisting of continuous strips of flat bar metal the centers of length of which are twisted and secured to said springs and clips for uniting the central portions of said bolster, said springs and said supporting-frame together.

In witness whereof, I have hereunto set my hand and seal this 18th day of September, 1919.

SIDNEY J. V. BOVEY.